(12) United States Patent
Schuering

(10) Patent No.: US 6,969,937 B1
(45) Date of Patent: Nov. 29, 2005

(54) MULTIPLE, PERMANENT-MAGNET ROTOR FOR A ROTATING ELECTRICAL MACHINE, AND A METHOD FOR PRODUCING SAME

(75) Inventor: Ingo Schuering, Schoenwalde (DE)

(73) Assignee: Siemens Aktiengellschaft, Munich (DE)

( * ) Notice: Subject to any disclaimer, the term of this patent is extended or adjusted under 35 U.S.C. 154(b) by 0 days.

(21) Appl. No.: 09/936,931

(22) PCT Filed: Mar. 17, 2000

(86) PCT No.: PCT/DE00/00853

§ 371 (c)(1),
(2), (4) Date: Jan. 24, 2002

(87) PCT Pub. No.: WO00/57537

PCT Pub. Date: Sep. 28, 2000

(30) Foreign Application Priority Data

Mar. 19, 1999 (DE) .................................. 199 14 021

(51) Int. Cl.⁷ .............................. H02K 1/00; H02K 1/22
(52) U.S. Cl. ............. 310/156.48; 310/261; 310/156.01
(58) Field of Search .................. 310/156.36, 152, 310/154.08, 154.17, 154.32, 156.01, 156.55, 310/216, 217, 261, 272, 273, 156.08, 156.12, 310/156.18, 156.28

(56) References Cited

U.S. PATENT DOCUMENTS

| | | | |
|---|---|---|---|
| 3,407,320 A | * | 10/1968 | McLean ....................... 310/87 |
| 4,167,692 A | * | 9/1979 | Sekiya et al. ................ 318/138 |
| 4,242,610 A | * | 12/1980 | McCarty et al. ........ 310/156.59 |
| 4,260,921 A | * | 4/1981 | Silver ...................... 310/156.59 |
| 4,296,544 A | * | 10/1981 | Burgmeier et al. ............ 29/598 |
| 4,332,079 A | * | 6/1982 | Silver ............................ 29/598 |
| 4,336,649 A | * | 6/1982 | Glaser ........................... 29/598 |
| 4,445,062 A | * | 4/1984 | Glaser .................... 310/156.59 |
| 4,480,207 A | * | 10/1984 | Miller et al. ........... 310/156.52 |
| 4,543,506 A | * | 9/1985 | Kawada et al. ........ 310/156.59 |
| 4,578,610 A | * | 3/1986 | Kliman et al. ......... 310/156.35 |
| 4,631,807 A | * | 12/1986 | Kawada et al. ................ 29/598 |
| 4,663,551 A | * | 5/1987 | Weh et al. ..................... 310/12 |
| 4,697,114 A | * | 9/1987 | Amemiya et al. ............ 29/598 |
| 4,700,096 A | * | 10/1987 | Epars .......................... 310/153 |
| 4,918,346 A | * | 4/1990 | Tajima et al. .......... 310/156.43 |
| 5,010,266 A | * | 4/1991 | Uchida .................. 310/156.22 |
| 5,039,897 A | * | 8/1991 | Iwamatsu et al. ...... 310/156.18 |
| 5,091,668 A | * | 2/1992 | Cuenot et al. ......... 310/156.61 |
| 5,140,211 A | * | 8/1992 | Ucida ..................... 310/156.61 |
| 5,162,686 A | * | 11/1992 | Royer ................... 310/156.59 |
| 5,345,133 A | * | 9/1994 | Satake ......................... 310/266 |

(Continued)

FOREIGN PATENT DOCUMENTS

DE    2 578 116    2/1985

(Continued)

OTHER PUBLICATIONS

"Researchers Pack More Into Electric Motor", Reed Business Publishing, Bd. 102, Nr. 1723, c. 1996, XP000597326, ISSN: 0959-8332.

(Continued)

Primary Examiner—Darren Schuberg
Assistant Examiner—Heba Elkassabgi
(74) Attorney, Agent, or Firm—Morrison & Foerster LLP

(57) ABSTRACT

In order to allow a rotating electrical machine, which uses a permanent-magnet rotor with a flux-concentration construction for a rated power of more than 100 kW, to be assembled as easily as possible, two mutually adjacent half-yokes of two poles as well as magnets arranged between them in each case form a pole element which can be fixed on its own on the rotor body.

5 Claims, 3 Drawing Sheets

U.S. PATENT DOCUMENTS

| | | | | |
|---|---|---|---|---|
| 5,378,953 | A | * | 1/1995 | Uchida et al. ......... 310/156.59 |
| 5,463,262 | A | * | 10/1995 | Uchida .................. 310/156.61 |
| 5,497,040 | A | * | 3/1996 | Sato ........................ 310/67 R |
| 5,604,390 | A | * | 2/1997 | Ackermann ........... 310/156.55 |
| 5,668,424 | A | * | 9/1997 | Lamb ........................ 310/103 |
| 5,672,926 | A | * | 9/1997 | Brandes et al. ............. 310/181 |
| 5,731,647 | A | * | 3/1998 | Schuller et al. ............. 310/114 |
| 5,757,091 | A | * | 5/1998 | Sogabe et al. ................. 310/12 |
| 5,786,650 | A | * | 7/1998 | Uchida et al. ......... 310/156.55 |
| 5,829,120 | A | * | 11/1998 | Uchida et al. ................ 29/598 |
| 5,886,441 | A | * | 3/1999 | Uchida et al. ......... 310/156.57 |
| 5,889,346 | A | * | 3/1999 | Uchida et al. ......... 310/156.57 |
| 5,939,810 | A | * | 8/1999 | Uchida et al. ......... 310/156.57 |
| 5,952,755 | A | * | 9/1999 | Lubas .................. 310/156.19 |
| 5,955,807 | A | * | 9/1999 | Kajiura et al. ......... 310/156.66 |
| 6,072,257 | A | * | 6/2000 | Akemakou .................. 310/191 |
| 6,147,415 | A | * | 11/2000 | Fukada ........................ 290/55 |
| 6,271,613 | B1 | * | 8/2001 | Akemakou et al. ......... 310/181 |
| 6,285,104 | B1 | * | 9/2001 | Nashiki ....................... 310/184 |
| 6,437,474 | B1 | * | 8/2002 | Chu ...................... 310/156.53 |
| 6,472,789 | B1 | * | 10/2002 | Akemakou ............. 310/156.57 |

FOREIGN PATENT DOCUMENTS

| | | | | |
|---|---|---|---|---|
| DE | EP0195741 | * | 3/1986 | .......... H02K 29/00 |
| DE | EP0582721 | * | 5/1997 | ............ H02K 1/27 |
| EP | 0 195 741 B1 | | 9/1986 | |
| EP | 0 582 721 B1 | | 2/1994 | |
| EP | 0 784 371 A1 | | 7/1997 | |
| FR | 2578116 A1 | * | 8/1986 | .......... H02K 21/08 |
| JP | EP 107317 | * | 5/1984 | .......... H02K 21/08 |
| JP | 61098144 | * | 5/1986 | .......... H02K 21/08 |
| JP | 04312334 | * | 11/1992 | ............ H02K 1/27 |
| JP | 05146103 | * | 6/1993 | ............ H02K 1/27 |
| JP | 05161325 | * | 6/1993 | .......... H02K 21/14 |
| JP | EP0784371 | * | 7/1996 | .......... H02K 41/03 |

OTHER PUBLICATIONS

Siemens-Zeitschrift 49, c.1975, Heft 6, S. 368ff/369, Bild 3.

* cited by examiner

MULTIPLE, PERMANENT-MAGNET ROTOR FOR A ROTATING ELECTRICAL MACHINE, AND A METHOD FOR PRODUCING SAME

CLAIM FOR PRIORITY

This application claims priority to International Application No. PCT/DE00/00853 which was published in the German language on Sep. 28, 2000.

TECHNICAL FIELD OF THE INVENTION

The invention relates to the field of rotating electrical machines, and in particular, to the design configuration of rotor cores which are fitted with permanent magnets using a flux concentration construction.

BACKGROUND OF THE INVENTION

Special permanent magnets, i.e., which are matched to the stringent requirements of electrical machines, have been successfully developed. Such magnets are used to produce the rotating magnetic field in the rotating electrical machines. Various options for the arrangement of the permanent magnets in the rotor or in the stator have been developed for motors and generators with rated powers up to 30 kW at 3000 rpm. In this case, "flux concentration construction" has been found to be the technically better solution above a rated power of several hundred watts. One embodiment of this construction is to arrange the permanent magnets in the pole gaps in the rotor (Siemens Journal 49, 1975, Issue 6, page 368 et seq./369, FIG. 3). One known design solution for this purpose is to arrange the permanent magnets, which have a flat rectangular cross section and are designed to be flat in the magnetization direction, radially with respect to the rotor axis in slot-like spaces in each case between two yokes that are fixed on the rotor body (EP 0 582 721 B1).

Rotors, fitted with permanent magnets for an electrical machine, and having poles which are welded to a hollow rotor shaft are shaped in such a manner that there is an accommodation area with a trapezoidal cross section between two poles, for permanent magnets which likewise have a trapezoidal cross section. The outer surface of the rotor is, in this case, formed by shrunk-on reinforcements composed of a copper-beryllium alloy (U.S. Pat. No. 4,242,610).

To handle of permanent magnets when constructing rotors of electrical machines, the magnet bodies are installed in the unmagnetized state and are magnetized once they have been arranged on the rotor, for example using the stator winding of the electrical machine (EP 0 195 741 B1).

Magnets which store a large amount of energy, for example based on neodymium-iron-boron (NeFeB), have been developed recently. The use of permanent-magnet rotors is now feasible even for electrical machines with a rated power of more than 100 kW, for example in ship propulsion systems with a rated power of 5 to 30 W. Machines such as these have a rotor diameter of more than 25 cm up to about 300 cm. If the rotors of machines such as these are constructed using flux concentration, this involves difficulties in the installation and securing of the magnets.

SUMMARY OF THE INVENTION

In one embodiment of the invention, there is a multipole, permanent-magnet rotor for a rotating electrical machine. The rotor includes, for example, permanent magnets to produce salient magnet poles and designed to be flat in a magnetization direction arranged radially with respect to a rotor axis in slot-like spaces between two yokes fixed on a rotor body, wherein each yoke is subdivided in a circumferential direction into two mutually adjacent half-yokes which extend over half of one pole pitch, and the two half-yokes of the two yokes are arranged alongside one another and are connected by end plates to form a pole element, the pole element fixed on the rotor body.

In another aspect of the invention, each of the two half-yokes is fitted with permanent magnets on a surface facing a slot-like intermediate space.

In another aspect of the invention, the intermediate space which remains between the two half-yokes of the pole elements is filled with material which is configured to expand under the influence of impregnation resin.

In yet another aspect of the invention, the permanent magnets are secured radially by double wedges.

In another aspect of the invention, the pole element is subdivided into a number of partial pole elements in an axial direction of the rotor.

In another embodiment of the invention, there is a method for producing a permanent-magnet rotor. The method includes, for example, magnetizing non-magnetical magnets before being arranged on a rotor body, and arranging radially permanent magnets to produce salient magnet poles which are configured to be flat in a magnetization direction with respect to a rotor axis in slot-like spaces between two yokes fixed on the rotor body, wherein each yoke is subdivided in a circumferential direction into two mutually adjacent half-yokes which extend over half of one pole pitch, the two half-yokes of the two yokes are arranged alongside one another and are connected by end points to form a pole element, the pole element fixed on the rotor body, and the magnets are magnetized once the two half-yokes have been joined together to form a pole element.

In still another aspect of the invention, the permanent magnets are cuboid.

BRIEF DESCRIPTION OF THE DRAWINGS

Three exemplary embodiments of rotors designed and produced according to the invention are illustrated, in detail form, in which.

DETAILED DESCRIPTION OF THE PREFERRED EMBODIMENTS

Figure 1:
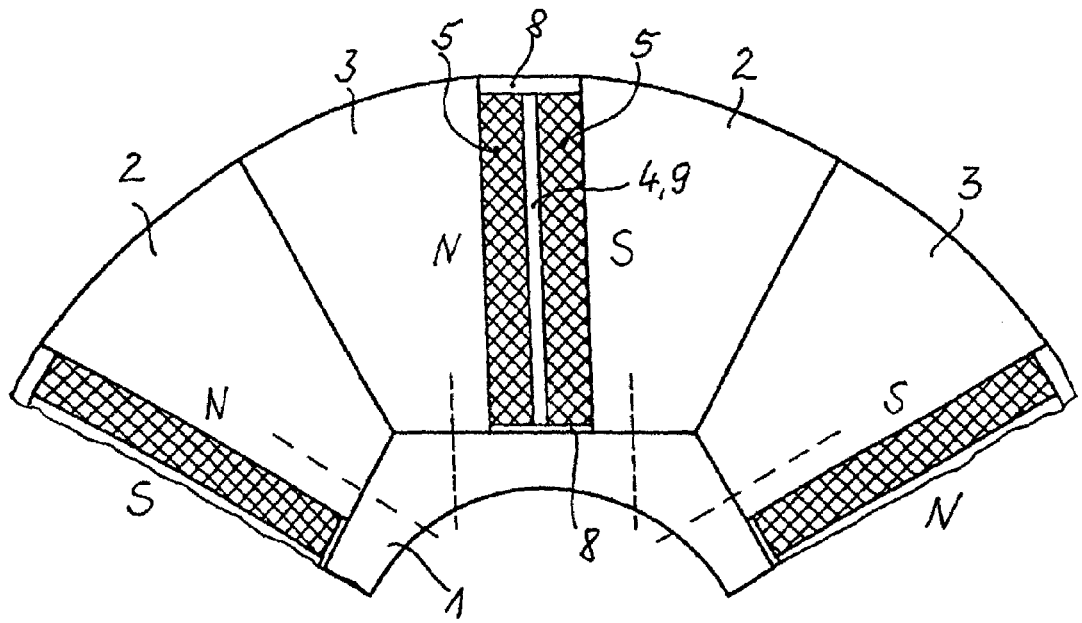
FIG. 1 shows an exemplary embodiment of the configuration of the poles and yokes of the present invention.

The invention discloses a rotor construction such that the permanent magnet can be stored without exerting large amounts of force.

This is achieved by providing for each yoke to be subdivided in the circumferential direction into two half yokes, each of which extend over half of one pole pitch. Two mutually adjacent half-yokes of two yokes are arranged alongside one another and are in each case connected by means of end plates to form a pole element. Each pole element is fixed on its own on the rotor body. In this case, the pole elements can be designed such that either each of the two half-yokes is fitted with permanent magnets on its surface facing a slot-like intermediate space, or such that only one of the two half-yokes is fitted with permanent magnets on the surface facing the other half-yoke. If the permanent magnets are arranged on the corresponding surfaces of the half-yokes and of the pole elements on the rotor body, it is expedient for the magnets to be fitted to the half-yokes in the unmagnetized state, and for the magnets to be magnetized once the two half-yokes have been joined together to form a pole element, but before the pole elements are fitted onto the rotor body.

Such a configuration of the poles and association between the magnets and the poles of the rotor allows both the pole elements, which comprise the half-yokes and magnets, and the individual magnets to be handled without exerting any excessive force while being arranged—generally by bonding—on the corresponding surfaces of the half-yokes. In the case of relatively long rotors, it is also preferable that the individual pole elements be subdivided into a number of partial pole elements in the axial direction of the rotor, in order to produce convenient units which are easy to magnetize.

When the individual parts of a pole element are being joined together, it may be expedient to fill the spaces which remain between the two half-yokes with a material which expands under the influence of impregnation resins. Furthermore, the permanent magnets which are arranged between the half-yokes can also be secured in the radial direction by double wedges, which are supported on corresponding projections on the half-yokes.

The two half-yokes which form a pole element are in each case connected by two preferably a magnetic end plates, which are screwed and pinned to the two half-yokes and permanently fix the two half-yokes with respect to one another. Once the pole elements have been assembled, they can be provided with surface protection by subsequent impregnation with a resin which, in particular, protects the corrosion-sensitive permanent magnets permanently against damaging influences.

Once the pole has been magnetized, they are placed on the tubular rotor body, and are screwed to it from the inside or outside. The rotor body is in this case preferably a magnetic.

The configuration of permanent-magnet rotors provided according to the invention can be applied both to machines with an internal rotor and to machines with an external rotor. External rotor machines may be, in particular, generators in wind power systems, or drive motors for hoist systems.

FIG. 1 shows a cross-sectional region of a rotor of an electrical machine, which comprises a rotor body 1, rotor yokes 2/3 mounted on the rotor body 1, and permanent magnets 5 mounted on the rotor yokes. Each rotor yoke is subdivided into two half-yokes 2, 3, with a slot-like intermediate space 4 being provided between each two yokes. The permanent magnets 5 are magnetized in the circumferential direction and are arranged in the slot-like intermediate spaces 4, with one permanent magnet 5, or one magnet layer comprising a large number of relatively small permanent magnets, in each case being arranged on that surface of the respective half-yoke which faces the slot-like intermediate space 4. The permanent magnets 5 are in this case normally bonded to the half-yoke 2 or 3. Alternatively, the two magnet layers can also be associated with only one of the two half-yokes.

The space which remains between two half-yokes 3 and 2 and between the mutually adjacent permanent magnets 5 may be filled, in one embodiment, with a material 9 which can expand under the influence of impregnation resin. Furthermore, to provide radial fixing for the permanent magnets 5, double wedges 8 can be arranged both between the rotor body 1 and the permanent magnets, and between the permanent magnets and the periphery of the rotor.

Figure 2:
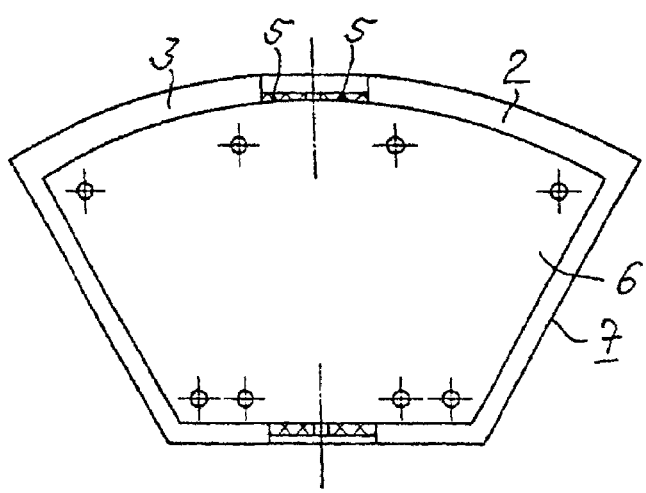
FIG. 2 shows a front view of a pole element designed according to the invention.

According to FIG. 2, two half-yokes 3, 2 are associated with different yokes are in each case joined to the permanent magnets 5 arranged on the corresponding side surfaces, by end plates 6, to form a pole element 7. A number of such pole elements are arranged independently of one another on the circumference of the rotor body 1, and are connected to the rotor body, for example by a screw joint.

During the production of the pole elements 7, it is preferable to arrange, for example to bond, the permanent magnet (which has not yet been magnetized) on the corresponding side surface of the half-yoke 2 or 3. Two half-yokes 2, 3 are then associated with one another, and are fixed with respect to one another by two end plates 6. After this, the pole element 7 that has been produced in this way is inserted into a magnetization apparatus, and the permanent magnets 5 are magnetized. The magnetized pole element 7 can then be arranged on the rotor body 1.

Figure 3:
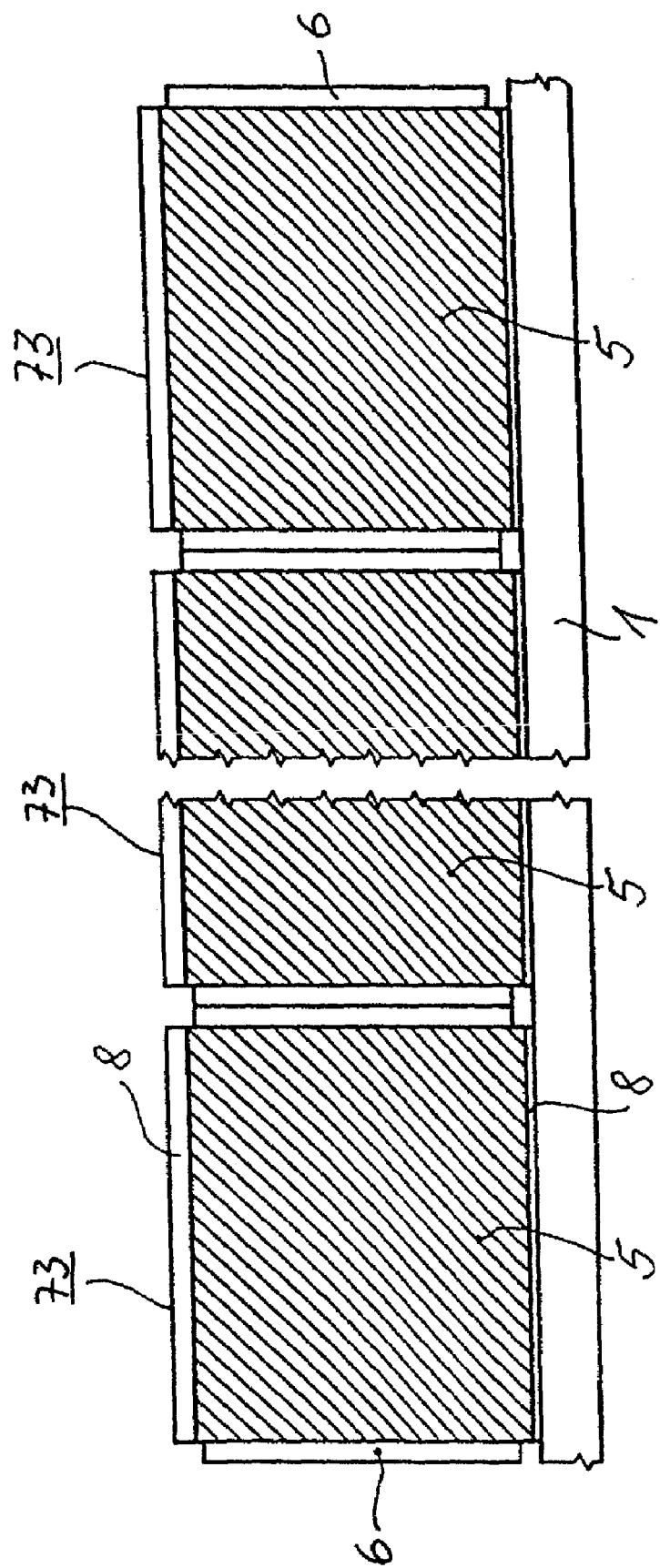
FIG. 3 shows the subdivision of a pole element into a number of partial pole elements.

In electrical machines having a relatively long rotor, it is preferable that the respective pole element 7 be subdivided into partial pole elements 73 in the axial direction of the rotor, as is illustrated in FIG. 3. In this case, a number of partial pole elements as illustrated in FIG. 2 are then arranged axially one behind the other on the rotor body.

Figure 4:
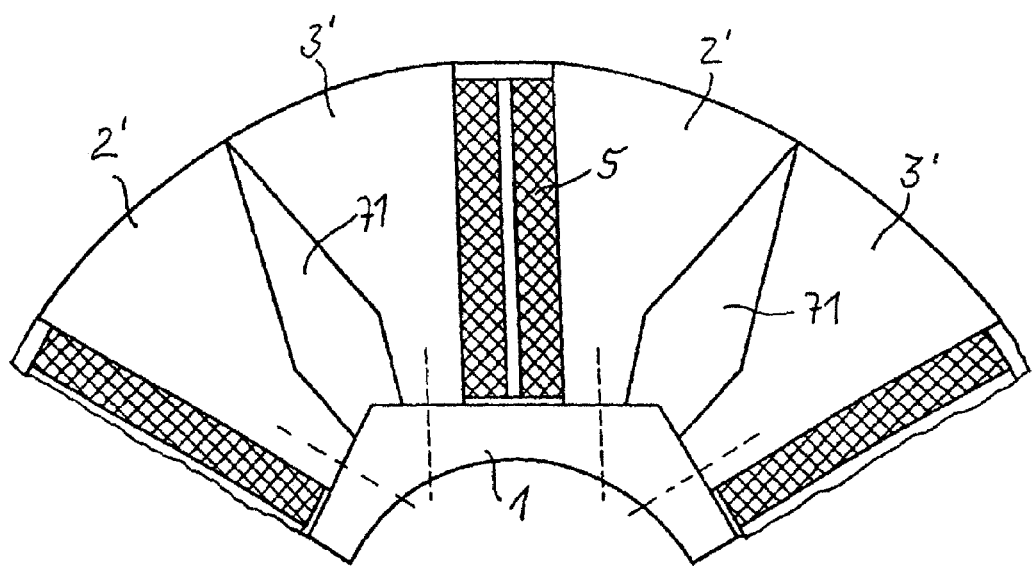
FIG. 4 shows an embodiment of the configuration of poles and yokes.

FIG. 4 shows an alternative embodiment of FIG. 1. In this case, the half-yokes 2', 3' are assigned such that there is a cavity 71, which acts as a flux barrier, between them. The proportion of the magnetic flux produced in the individual half-yokes by the stator winding can then be influenced via this cavity.

Figure 5:
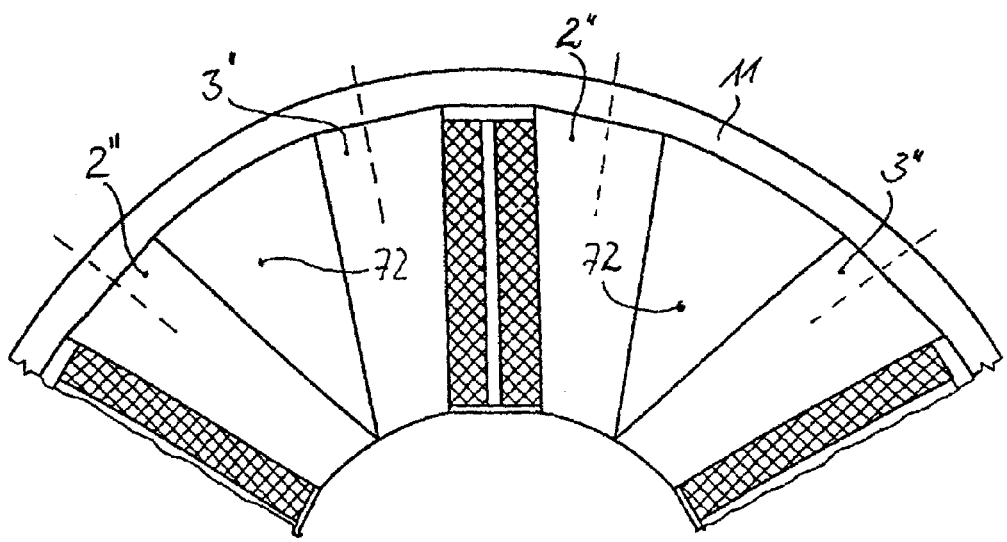
FIG. 5 shows the configuration of poles and yokes arranged on an external rotor.

The rotor illustrated in FIG. 5 is an external rotor with an externally arranged supporting body 11. The arrangement of half-yokes 2" and 3" and the configuration of the permanent magnets 5 corresponds in principle to the exemplary embodiments shown in FIGS. 1 and 4. In this case, in contrast to FIG. 4, a V-shaped, flux-free area 72 is provided between each two half-yokes.

What is claimed is:

1. A multipole, permanent-magnet rotor for a rotating electrical machine, comprising:
   permanent magnets designed to be flat in a magnetization direction are arranged radially with respect to a rotor axis in slot-like spaces between two yokes fixed on a rotor body, wherein each yoke is subdivided in a circumferential direction into two mutually adjacent half-yokes which extend over half of one pole pitch, and
   the two half-yokes of the two yokes are arranged alongside one another and are connected by end plates to form a pole element, the pole element fixed on the rotor body, wherein each of the two half-yokes is fitted with permanent magnets on a surface facing a slot-like intermediate space that is filled with material configured to expand under the influence of impregnation resin.

2. The permanent rotor as claimed in claim 1, wherein the permanent magnets are secured radially by double wedges.

3. The permanent rotor as claimed in claim 1, wherein the pole element is subdivided into a number of partial pole elements in an axial direction of the rotor.

4. The rotor of claim 1, wherein the permanent magnets are cuboid.

5. A method for producing a permanent-magnet rotor, comprising:
- arranging radially permanent magnets which are configured to be flat in a magnetization direction with respect to a rotor axis in slot-like spaces between two yokes fixed on the rotor body,
- wherein each yoke is subdivided in a circumferential direction into two mutually adjacent half-yokes which extend over half of one pole pitch,
- arranging the two half-yokes of the two yokes alongside one another and connecting the two half-yokes by end plates to form a pole element, the pole element fixed on the rotor body,
- wherein each of the two half-yokes is fitted with permanent magnets on a surface facing a slot-like intermediate space that is filled with material configured to expand under the influence of impregnation resin, and
- magnetizing the magnets once the two half-yokes have been joined together to form a pole element.

* * * * *